United States Patent
Sreenivasagaperumal et al.

(10) Patent No.: US 11,469,923 B2
(45) Date of Patent: Oct. 11, 2022

(54) SYSTEMS AND METHODS FOR IMPROVING BROADCAST, UNKNOWN-UNICAST, AND MULTICAST TRAFFIC IN MULTIHOMED VIRTUAL EXTENSIBLE LOCAL ACCESS NETWORK ETHERNET VIRTUAL PRIVATE NETWORKS

(71) Applicant: DELL PRODUCTS L.P., Round Rock, TX (US)

(72) Inventors: Damodharan Sreenivasagaperumal, Chennai (IN); Ramasubramani Mahadevan, Chennai (IN)

(73) Assignee: DELL PRODUCTS L.P., Round Rock, TX (US)

(*) Notice: Subject to any disclaimer, the term of this patent is extended or adjusted under 35 U.S.C. 154(b) by 0 days.

(21) Appl. No.: 16/882,423

(22) Filed: May 22, 2020

(65) Prior Publication Data

US 2021/0320818 A1 Oct. 14, 2021

(30) Foreign Application Priority Data

Apr. 9, 2020 (IN) .............................. 202011015519

(51) Int. Cl.
*H04L 12/46* (2006.01)
*H04L 45/74* (2022.01)
(Continued)

(52) U.S. Cl.
CPC ...... *H04L 12/4633* (2013.01); *H04L 12/4641* (2013.01); *H04L 45/16* (2013.01); *H04L 45/66* (2013.01); *H04L 45/74* (2013.01)

(58) Field of Classification Search
None
See application file for complete search history.

(56) References Cited

U.S. PATENT DOCUMENTS

2017/0195210 A1* 7/2017 Jacob ...................... H04L 45/74
2018/0167315 A1* 6/2018 Kanjariya ............... H04L 45/02
(Continued)

OTHER PUBLICATIONS

Mohanty et al., "BGP EVPN Flood Traffic Optimization," Mar. 5, 2018.
(Continued)

*Primary Examiner* — Christine T Duong
(74) *Attorney, Agent, or Firm* — North Weber & Baugh LLP (57) ABSTRACT

A set of remote Virtual Extensible LAN (VxLAN) tunnel endpoints (VTEPs) and an ingress VTEP associated different Ethernet Segments (ESs) elect amongst themselves designated forwarder (DF) for forwarding broadcast, unknown-unicast, and multicast traffic (BUM) traffic by triggering an RFC 7432 election mechanism on each of the VTEPs. In embodiments, DF election involves exchanging configuration information, such as Type-4 routes for ESs via Border Gateway Protocol (BGP), without being confined to a particular ES that is local to all VTEPs, i.e., irrespective of local ES and internet identifiers. This allows performing targeted forwarding of BUM traffic to intended VTEPs which avoiding unnecessary ingress replication of BUM traffic in the ingress VTEP, thereby, saving hardware buffer resources and avoiding unnecessary flooding of frames to a set of non-forwarding egress VTEPs, ultimately, reducing the load on the egress VTEP and freeing up packet processing resources.

20 Claims, 6 Drawing Sheets (51) Int. Cl.
*H04L 45/00* (2022.01)
*H04L 45/16* (2022.01)

(56) References Cited

U.S. PATENT DOCUMENTS

2018/0302321 A1* 10/2018 Manthiramoorthy ........................ H04L 49/1569
2021/0119827 A1* 4/2021 Codandam .......... H04L 12/4641

OTHER PUBLICATIONS

[online], [Retrieved Oct. 14, 2020]. Retrieved from Internet <URL: https://tools.ietf.org/html/draft-mohanty-bess-evpn-bum-opt-00> (9pgs).

* cited by examiner

SYSTEMS AND METHODS FOR IMPROVING BROADCAST, UNKNOWN-UNICAST, AND MULTICAST TRAFFIC IN MULTIHOMED VIRTUAL EXTENSIBLE LOCAL ACCESS NETWORK ETHERNET VIRTUAL PRIVATE NETWORKS

CROSS-REFERENCE TO RELATED APPLICATION

This patent application claims priority benefit under 35 USC § 119 to the Indian Patent Application Number 202011015519, filed in the Indian Patent Office on 9 Apr. 2020, entitled "SYSTEMS AND METHODS FOR IMPROVING BROADCAST, UNKNOWN-UNICAST, AND MULTICAST TRAFFIC IN MULTIHOMED VIRTUAL EXTENSIBLE LOCAL ACCESS NETWORK ETHERNET VIRTUAL PRIVATE NETWORKS," and listing Damodharan Sreenivasagaperumal and Ramasubramani Mahadevan as inventors, which patent document is incorporated by reference herein in its entirety and for all purposes.

BACKGROUND

The present disclosure relates generally to computer networking and, more particularly, to systems and methods for improving Ethernet virtual private network (EVPN) behavior and broadcast, unknown-unicast, and multicast traffic (BUM) traffic flow in multihomed Virtual Extensible LAN (VxLAN) EVPNs.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In EVPNs that support BUM traffic, typically, delivering BUM traffic to a multihomed host device, i.e., a host device that has a number of VxLAN tunnel endpoints (VTEPs) that are part of a virtual network connected to the same Ethernet Segment (ES), involves a source VTEP that sends BUM traffic to all participating VTEPs in the common ES, even if only one of the VTEPs is elected to become the designated forwarder (DF). As a result of only one VTEP (i.e., the DF) being responsible for forwarding the BUM traffic in a particular ES associated with a particular VLAN, all other (non-DF) VTEPs block or drop BUM traffic received on the underlay fabric network that comprises spines and VTEPs.

In existing approaches, BUM traffic is therefore flooded across the fabric through network to all remote VTEPs hosting the same VxLAN segment. Such methods are highly inefficient in that they cause non-DF VTEPs to unnecessarily receive flooded frames, thus, wasting bandwidth in the VxLAN underlay fabric network. Further, unnecessary ingress replication in the originating leaf VTEP leads to sub-optimal hardware buffer utilization.

Accordingly, it is highly desirable to find flexible and network-efficient ways to conserve bandwidth and reduce the amount of BUM traffic that is sent via the underlay network.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may be not to scale.

DETAILED DESCRIPTION OF THE PREFERRED EMBODIMENTS

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms and any lists the follow are examples and not meant to be limited to the listed items.

A service, function, or resource is not limited to a single service, function, or resource; usage of these terms may refer to a grouping of related services, functions, or resources, which may be distributed or aggregated. The use of memory, database, information base, data store, tables, hardware, and the like may be used herein to refer to system component or components into which information may be entered or otherwise recorded. The terms "data," "information," along with similar terms may be replaced by other terminologies referring to a group of bits, and may be used interchangeably. The terms "packet" or "frame" shall be understood to mean a group of bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell."

It shall also be noted that although embodiments described herein may be described within the context of VxLANs and VTEPs, aspects of the present disclosure are not so limited. Accordingly, the aspects of the present disclosure may be applied or adapted for use in other contexts.

Figure 1:
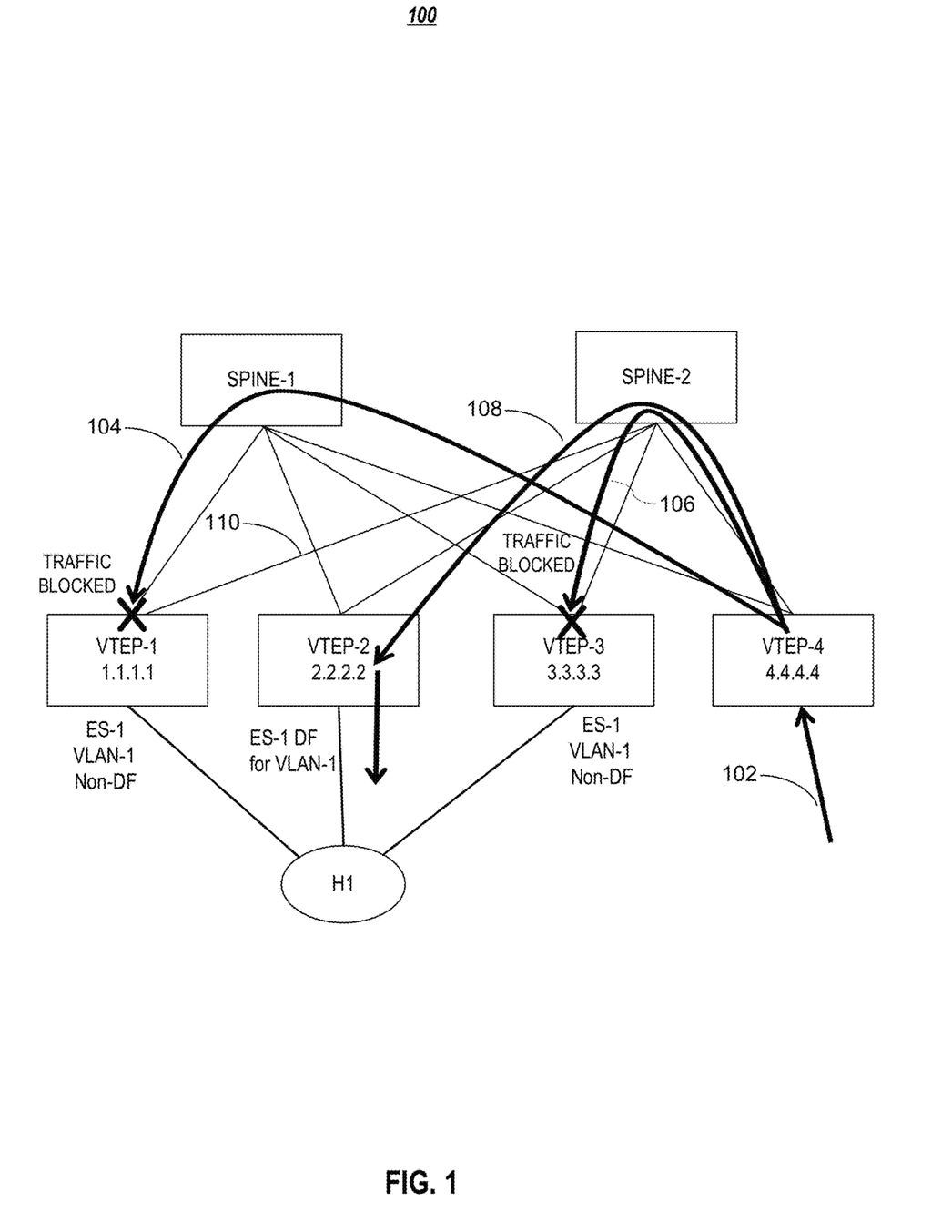
FIG. 1 depicts a multihomed VxLAN EVPN topology that forwards BUM traffic according to the RFC 7432 standard.

FIG. 1 depicts a multihomed VxLAN EVPN topology that forwards BUM traffic according to the RFC 7432 standard, entitled "Requirements for Ethernet VPN (EVPN)," that defines the DF election mechanism in multihomed EVPNs. Network 100 in FIG. 1 may be part of a VxLAN segment that comprises host H1 that is multihomed to three physical VTEPs (labeled VTEP-1, VTEP-2, and VTEP-3) associated with the same Ethernet Segment Identifier (ESID), ES-1. Typically, an ESID is used to ensure that VTEPs that are multihomed to the same host (e.g., host 1), on a given ES (e.g., ES-1) can discover each other. While an ESID uniquely identifies the host at a given VTEP, the host itself remains agnostic to the VTEPs connects to.

In FIG. 1, ingress VTEP, VTEP-4, receives traffic 102 from a host (not shown) that is not physically connected to any of switches VTEP-1, VTEP-2, or VTEP-3 but is part of the same broadcast domain, VLAN-1, such that the host coupled to VTEP-4 and host H1 may communicate with each other. All VTEPs have logical VxLAN tunnels (e.g., 110) forming paths connecting each other (e.g., path 104 between VTEP-1 and VTEP-4). Egress VTEPs, VTEP-1 and VTEP-3, receive traffic via paths 104, 106, thus, they constitute tunnel endpoints.

Based on RFC 7432, network 100 elects a DF for the combination VLAN1-ES1, for example, after a discovery process in the Border Gateway Protocol (BGP) EVPN control plane, which ensures that VTEP-1 through VTEP-3 know that they are multihomed to host H1. Generally, the elected DF is responsible for forwarding BUM traffic from a remote VTEP (VTEP-4) to a local ES (ES-1) associated with a particular VLAN (VLAN-1), while a non-elected VTEP (i.e., non-DFs VTEP-1 and VTEP-3) will block such BUM traffic to avoid duplicate traffic on the host (H1). According to the RFC standard, the set of VTEPs having the same ESID (ES-1) runs the DF election mechanism and elects one VTEP (here, VTEP-2, as discussed next) as DF for an ES-VLAN pair.

In detail, RFC 7432 has two key prerequisites. First, all VTEPs participating in the DF election have the same ESID. Second, each VTEP has a unique VTEP IP address, indicated in FIG. 1 as 1.1.1.1 for VTEP-1, 2.2.2.2 for VTEP-2, etc., such that a packet can be directed to a specific VTEP IP.

DF election for local VLAN-1 comprising ES-1 operates on a modulo principle: All VTEPs that belong to the same ES are listed by VTEP IP in increasing numeric order and are indexed starting at numeral 0. For example, VTEP-2 will list VTEP-1 and VTEP-3 as remote VTEPs that host the same ES-1 for VxLAN virtual network ID (VNID)-1, which is mapped to VLAN-1 on the local links towards the host. Assuming N is the number of VTEPs, the VTEP in the index (VLAN mod N) is the DF for VLAN.

In example in FIG. 1, since three VTEPs that are associated with ES-1, VTEP-1 is indexed with numeral 0 and is assigned IP address 1.1.1.1; VTEP-2 is indexed with numeral 1 and is assigned IP address 2.2.2.2; and VTEP-3 is indexed with numeral 2 and is assigned IP address 3.3.3.3. Thus, for VLAN-1, the DF is determined as (1%3)=1, i.e., pointing to VTEP-2. As a result, VTEP-2 is elected for VLAN-1 to forward BUM traffic sent to ES-1. Conversely, VTEP-1 and VTEP-3 will block any BUM traffic sent to ES-1. In other words, only VTEP-2 will forward BUM traffic to ES-1. It is noted that all VTEPs in FIG. 1, which belong to one of two possible combinations (VLAN-1, ES-1) and (VLAN-1, ES-2), are part of virtual network 1, i.e., all VTEPs have the same VNID.

In existing networks, the discovery that triggers DF election is based on each VTEP using each other's Type-4 input information, i.e., a VTEP IP along with an ESID, to find ES information that serves the basis for deciding whether to initiate DF election. For example, if VTEP-4 receives information originating from VTEP-1, VTEP-2, and VTEP-3 and, consistent with RFC 7432, VTEP-4 will examine the Type-4 routes and find that the received information has ES-1 data, i.e., that the ESID information does not match the local configuration of VTEP-4. From this, VTEP-4 will conclude that it is not multihomed to any of the other VTEPs in FIG. 1. As a result, according to RFC 7432, which treats an ES (e.g., ES-1) as non-local to the set of VTEPs (VTEP-4), when electing a DF, VTEP-4 will ignore, and not further examine, Type-4 routes provided by VTEP-1 through VTEP-3, which are not multihomed on the same host as VTEP-4. In contrast, as discussed in greater detail below, embodiments utilize various types of information available to a VTEP when electing a DF using RFC 7432 principles irrespective of their ESID.

In network 100, each VTEP generates a flood list that determines where to forward traffic based on a VNID, such that the default flood list comprises all other VTEPs on the virtual network, here VN-1. For example, since all VTEPs include VN-1, the default flood list for VTEP-4 comprises 1,1; 2,2; and 3,3. Similarly, the VTEP-1 default flood list comprises 2,2; 3,3; and 4,4. In operation, in response to VTEP-4 discovering that VTEP-1, VTEP-2, and VTEP-3 have the same VN1, VTEP-4 creates a flood list that will flood BUM traffic it receives to VTEP-1, VTEP-2, and VTEP-3, such that all three VTEPs receive BUM traffic from VTEP-4.

After DF election of VTEP-2 as the VTEP that is responsible for forwarding BUM traffic sent to ES-1 and received on the fabric, non-elected VTEPs, VTEP-1 and VTEP-3 will block such BUM traffic, e.g., in response to being programmed based on a control plane. However, as previously indicated, flooding egress VTEPs with BUM traffic and letting them decide which VTEP should ultimately forward the BUM traffic is highly inefficient causing non-DF VTEPs to waste bandwidth by unnecessarily receiving three copies of the same data through spine-2. Similarly, ingress VTEP-4 has to unnecessarily replicate that data, thus, further consuming bandwidth.

Therefore, it would be desirable to have efficient systems and methods that avoid replication and reduce the amount of overall BUM traffic sent across the network.

Figure 2:
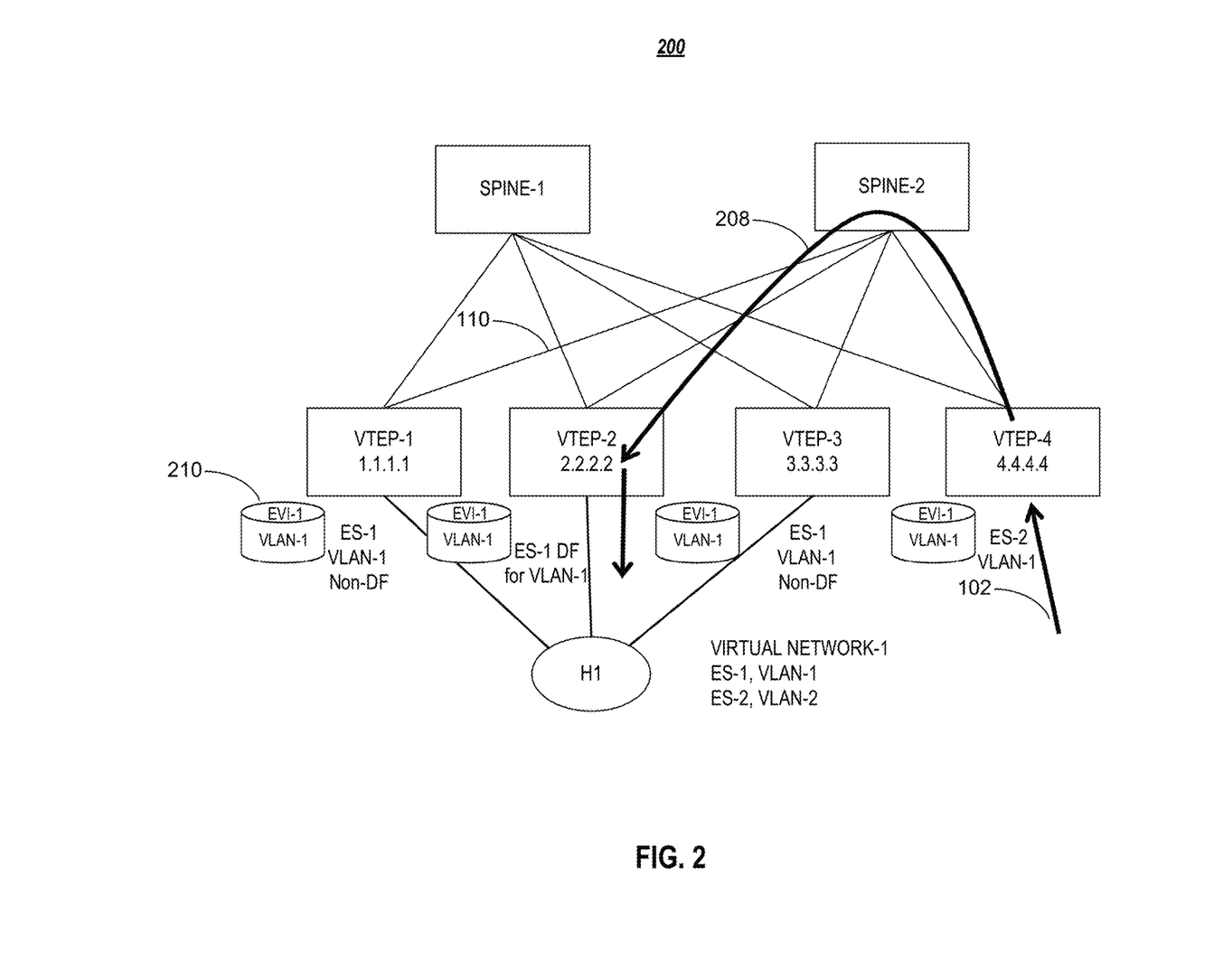
FIG. 2 depicts a multihomed VxLAN EVPN topology that forwards BUM traffic in accordance with various embodiments of the present disclosure.

FIG. 2 depicts a multihomed VxLAN EVPN topology that forwards BUM traffic in accordance with various embodiments of the present disclosure. In embodiments, network 200 comprises host H that, as in FIG. 1, is multihomed to physical VTEPs having ESID ES-1 that, in operation, allows VTEP-1, VTEP-2, and VTEP-3 to discover each other. It is noted that ESIDs may be manually configured, or derived, e.g., using a protocol such as the Link Aggregation Control Protocol (LACP).

In embodiments, each VTEP is associated with EVPN instance (EVI) and VLAN-1 and may have a logical tunnel (e.g., 110) to any other VTEP. The VxLAN may utilize UDP encapsulation and a VxLAN header to form tunnels between each switch. Within a tunnel, the VxLAN header carries the VNID rather than a VLAN-ID, which is not exchanged in the BGP EVPN control plane. Once VTEP-1 receives a tagged packet from host 1, VTEP-1 strips the VLAN header, encapsulates the remaining full packet with the L2 header intact into a VxLAN header that is further encapsulated in a UDP header, before sending it via spine-1 to a remote VTEP. A DF election mechanism to forward BUM traffic from one of VTEP-1, VTEP-2, or VTEP-3 to a local ES associated with a VLAN is described next.

In embodiments, ingress VTEP-4 that is associated with a ES-2, i.e., a different ES than VTEP-1 through VTEP-3, together with VTEP-1 through VTEP-3 elect amongst themselves a VTEP, here VTEP-2, that serves as a DF for forwarding BUM traffic. In embodiments, the DF election mechanism involves triggering a mechanism similar to that set forth in RFC 7432 with a main difference that all VTEPs in FIG. 2 may participate in DF election. In embodiments, this may be accomplished by exchanging configuration information, e.g., Type-4 routes for ES-1 and ES-2, as part of a discovery process in the BGP EVPN control plane.

In embodiments, VTEP-4 may obtain and use Type-4 route information, e.g., VTEP-1 IP and ESID, which originate from VTEP-1, VTEP-2, and VTEP-3, to calculate the DF as a potential VTEP that may forward BUM traffic, instead of causing flooding traffic to all other VTEPs and despite the fact that VTEP-4 is not associated with the same ESID (here ES-1) as any of VTEP-1, VTEP-2, and VTEP-3. Thus, contrary to the DF selection process prescribed by RFC 7432, DF selection according to embodiments of the present disclosure is not confined to a particular ES that is local to all VTEPs. Instead, in embodiments, DF election may be performed irrespective of local ESIDs and internet identifiers. Stated differently, the DF election may comprise triggering RFC 7432 for VTEPs from two or more different ES (here, ES-1 and ES-2) that may participate in the DF election process, and VTEPs are not required to host the same ES. In this manner, targeted forwarding of BUM traffic to intended VTEPs may be performed while, at the same time, avoiding unnecessary ingress replication of BUM traffic in ingress VTEP-4. In addition, this saves hardware buffer resources and avoids unnecessary flooding of frames to a set of non-forwarding egress VTEPs (here, VTEP-1 and VTEP-3), thereby, reducing the load on egress VTEPs and freeing up packet processing resources.

It is noted that under the RFC standard, which assumes for a simple single-rack dual-homed hosts—a typical deployment scenario—that DF election is distributed based on the VLAN-ID, DF election occurs "per ES." As a result, in embodiments, VTEP-4, which operates on a different ES, namely ES-2, may also run the DF election algorithm and participate in the DF election.

For example, although VTEP-4 in FIG. 2 has ES-2 in it local segment, which is not the same ESID as for remote VTEPs VTEP-1 through VTEP-3, in embodiments, VTEP-4 may utilize Type-1 Ethernet auto discovery (EAD) routes and Type-4 ES routes that originate from the remote VTEPs that provide local ES information. In embodiments, in order to derive the VLAN-IDs associated with the remote VTEPs (unknown to VTEP-4 since ES-1 is not locally configured on VTEP-4), VTEP-4 may use the EVPN instance-route target (EVI-RT), e.g., from Type-1 EAD route information for each ESID, to derive its local VLAN-ID mapping within its node in a given VxLAN segment. It is noted that to ensure seamless operation of the presented DF election mechanism, a user should avoid mapping different VLAN-IDs for a same VxLAN segment. Once VTEP-4 derives VLAN-1 for ESID-1, VTEP-4 may run a DF election mechanism for ES-1 to obtain DF information for each ESID associated with all other remote VTEPs, even if VTEP-4 itself is not locally present at ES-1.

In embodiments, VTEP-4 may use the list of all VTEPs derived for all ESs associated with a VxLAN VNID segment to determine a final flood list associated with an EVPN instance for forwarding BUM traffic. In embodiments, the flood list may have been created due to VTEPs discovering each other based on common VN-1.

In embodiments, e.g., where ES and VLAN are uniformly spread, as is typical for a single rack dual Top or Rack use case, a DF is selected for each (ES, VLAN) pair by all VTEPs in FIG. 2, i.e., VTEP-1 through VTEP-4, and VTEP-4 from which traffic ingresses sends BUM traffic, via path 208, only to the selected DF VTEP-2.

As a result, VTEP-4 would comprise only VTEP-2 in its flood list. In embodiments, the flood list may be updated by re-initiating the DF election mechanism, e.g., whenever there is a change in a Type-4 route. For example, if the link from VTEP-2 to host 1 does down, the changed Type-4 route information VTEP-4 receives from VTEP-2 may trigger a re-election that turns, e.g., VTEP-1 into the current DF. It is noted that a DF algorithm may be run for each ESID, i.e., for different ESs on a same VLAN to identify the elected DF, in effect, taking advantage of the fact that the RFC standard assumes that the VLAN mapping to VNID mapping is the same everywhere.

In embodiments, the modulo principle in RFC 7432 may be utilized such that, unlike for existing designs, for each ES a modulo with respect to a VLAN-ID may be applied to a set of remote VTEPs.

Figure 3:
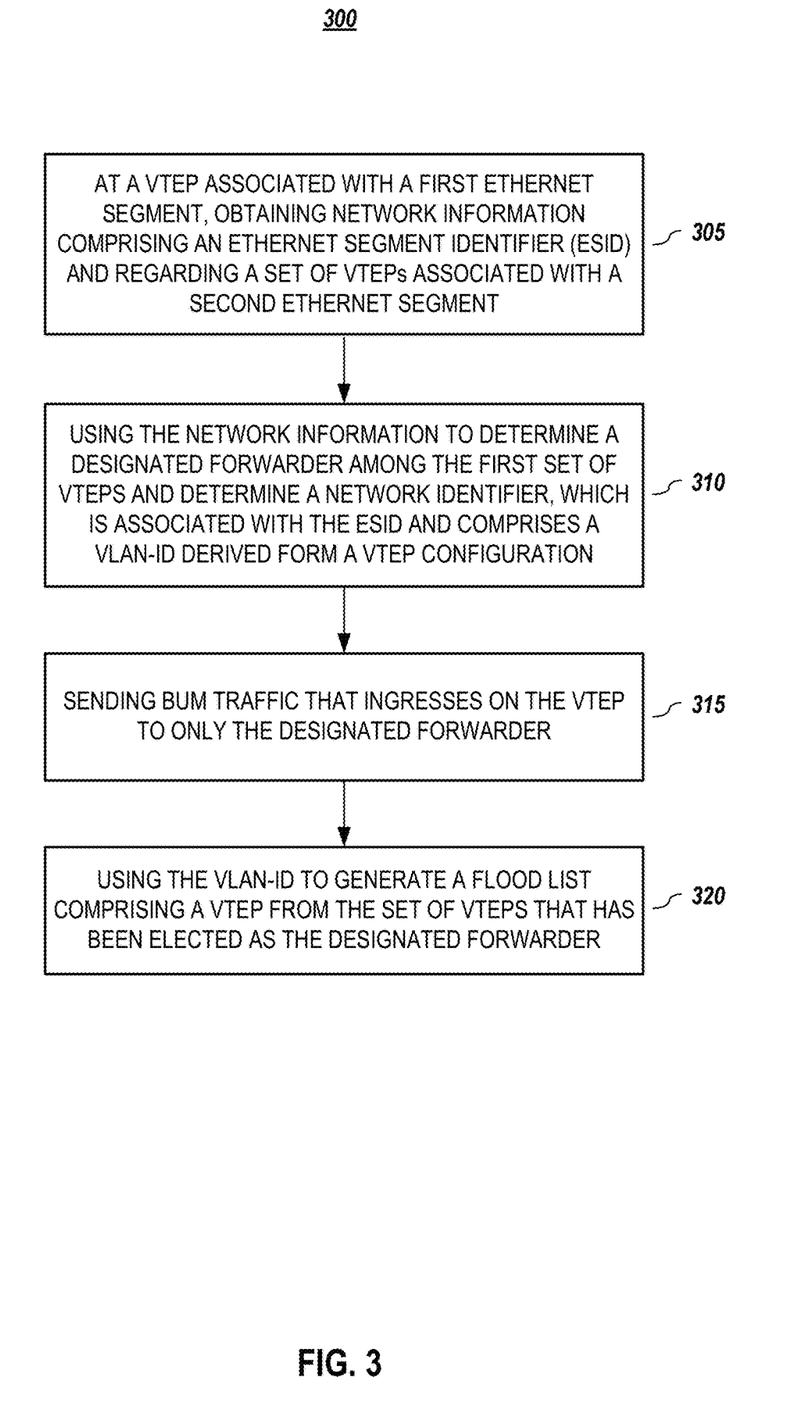
FIG. 3 is a flowchart that illustrates a process for using a multihomed VxLAN EVPN topology for forwarding BUM traffic according to embodiments of the present disclosure.

FIG. 3 is a flowchart that illustrates a process for using a multihomed VxLAN EVPN topology for forwarding BUM traffic according to embodiments of the present disclosure. In embodiments, process 300 may begin when a VTEP associated with a first Ethernet segment, obtains (302) network information comprising an ESID, the network information regarding a set of VTEPs associated with a second Ethernet segment. In embodiments, the network information is used to determine (304) a designated forwarder among the first set of VTEPs and determine a network identifier, which is associated with the ESID and comprises a VLAN-ID derived from a VTEP configuration.

BUM traffic that ingresses on the VTEP may be sent (306) to the designated forwarder. Finally, the VLAN-ID may be used to generate (308) a flood list comprising a VTEP from the set of VTEPs, where the VTEP has been elected as the designated forwarder.

It is noted that: (1) certain steps may optionally be performed; (2) steps may not be limited to the specific order set forth herein; (3) certain steps may be performed in different orders; and (4) certain steps may be done concurrently.

Figure 4:
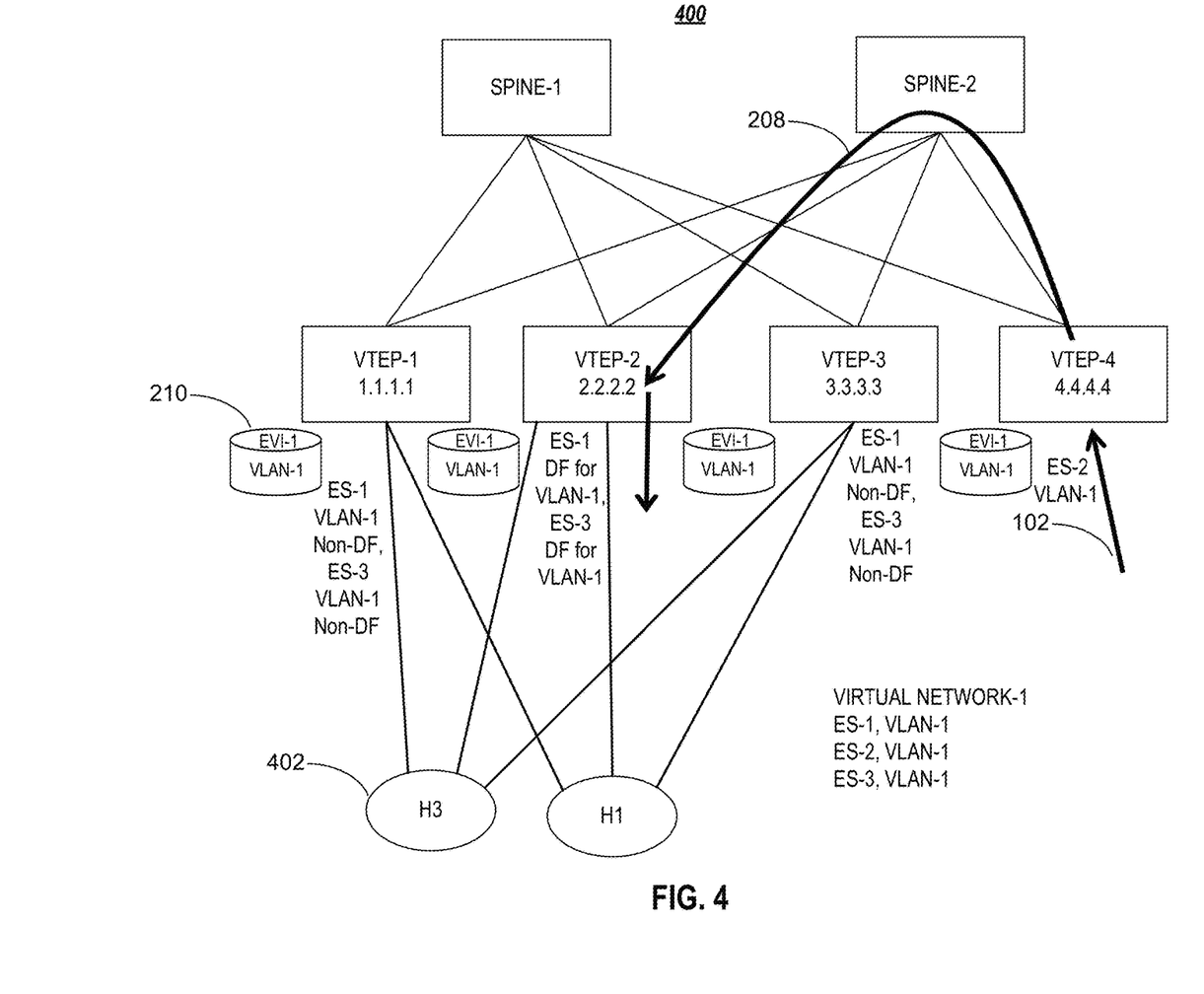
FIG. 4 depicts another multihomed VxLAN EVPN topology that forwards BUM traffic according to embodiments of the present disclosure.

In embodiments, the network shown in FIG. 2 maybe further extended to a virtual network that comprises additional hosts that each may have a different ES (i.e., a set of links that connect to that host) as part of the same VLAN. FIG. 4 depicts an alternative multihomed VxLAN EVPN topology that forwards BUM traffic according to embodiments of the present disclosure. Components similar to those shown in FIG. 2 are labeled in the same manner. For purposes of brevity, a description or their function is not repeated here. Network 400 comprises host 3 that has a physical connection to VTEP-1, VTEP-2, and VTEP-3 that form ES-3, which has unique identifier ES-3 in FIG. 4. A person of skill in the art will appreciate that, in embodiments, for a given VN, a DF may be identified for each ES.

Since, per RFC 7432, for each ESID all VTEPs for a common VLAN use each other's information when performing DF election, e.g., by running the same algorithm, each VTEP will reach the same result and comprise the same flood list. Therefore, in embodiments, assuming H3 is multihomed to VTEP-1 through VTEP-3 and is attached to ES-3 as shown in FIG. 4, first, a DF election algorithm may be run for ES-1, e.g., to identify VTEP-2 as the DF. Then the DF election algorithm may be run for ES-3, again, to identify VTEP-2 as the DF. In this manner, network 400 knows that for each ES, on the same VLAN-1, VTEP-2 will be the DF. As result, the flood lists will comprise only VTEP-2.

In embodiments, if an ES (e.g., ES-3) has a different VTEP chosen as the DF, e.g., VTEP-1, such that only VTEP-1 will forward BUM traffic for ES-3, then VTEP-4 would also select VTEP-1 as DF for ES-3 and VTEP-2 as DF for ES-1. Both VTEP-1 and VTEP-2 will be added to flood list of VN-1 in VTEP-4.

Advantageously, the presented systems and methods do not affect the functionality of existing mechanisms and protocols, such as load-balancing algorithms with (Ethernet tag, ESID) and extended community for hash-algorithms. In addition, link failure and orphan ports are accounted for. For example, in embodiments, "OR"ing of all the DF elected VTEPs for all ESs in a VxLAN segment may provide the head-end replication flood list for the virtual network. If an orphan port happens to be on one node for a given ES and a peer node is elected as DF for another ES, then the flood list may comprise both the VTEPs for head-end replication for the virtual network. The same holds true for link failure cases. Type-1 Ethernet auto discovery (EAD) routes may be withdrawn when an ES-link goes down, which may help all remote VTEPs to recompute the DF and, thus, derive an updated flood list for the virtual network.

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, etc.) smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 5:
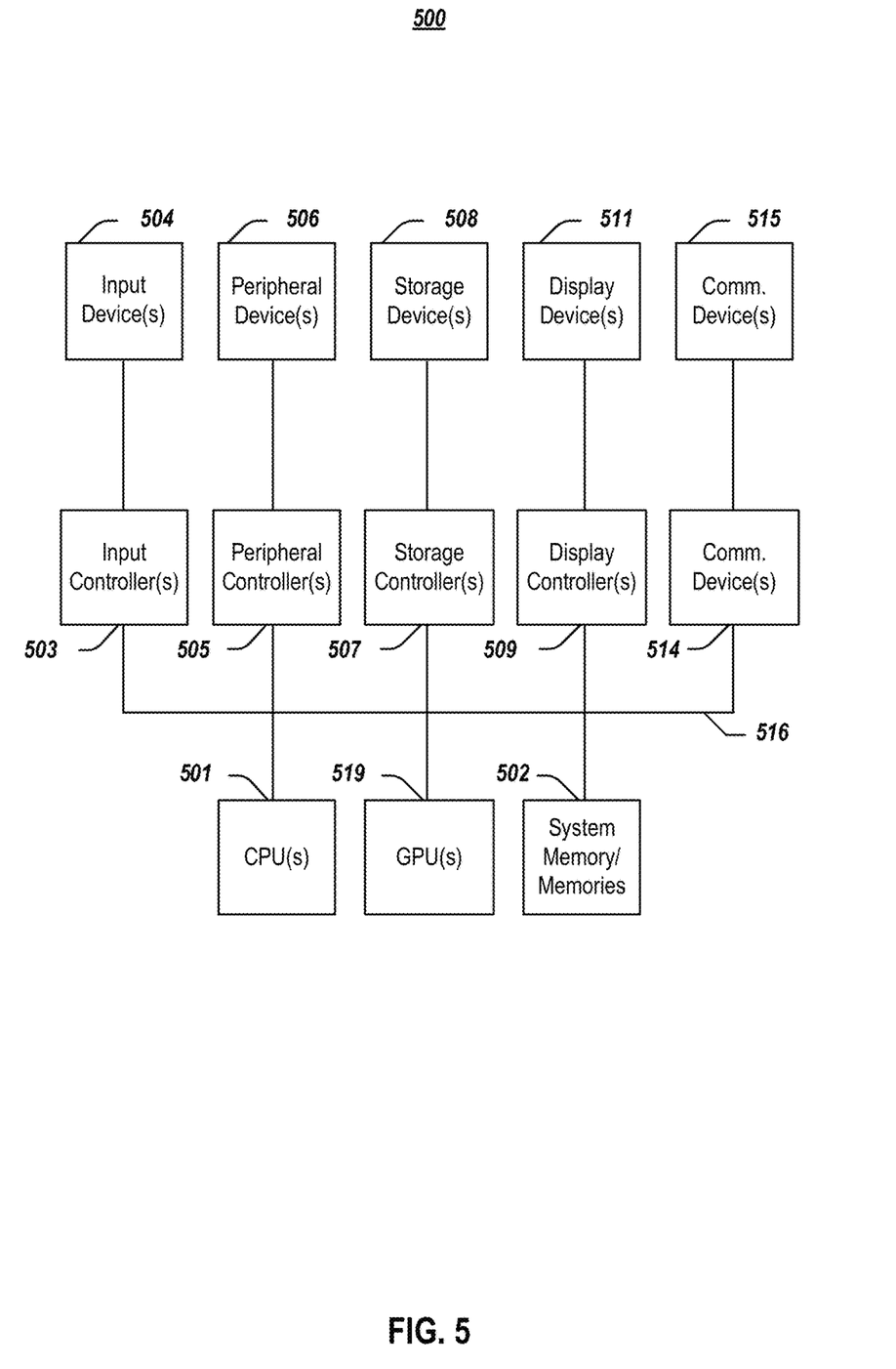
FIG. 5 depicts a simplified block diagram of an information handling system according to embodiments of the present invention.

FIG. 5 depicts a simplified block diagram of an information handling system (or computing system) according to embodiments of the present disclosure. It will be understood that the functionalities shown for system 500 may operate to support various embodiments of a computing system—although it shall be understood that a computing system may be differently configured and include different components, including having fewer or more components as depicted in FIG. 5.

As illustrated in FIG. 5, the computing system 500 includes one or more central processing units (CPU) 501 that provides computing resources and controls the computer. CPU 501 may be implemented with a microprocessor or the like, and may also include one or more graphics processing units (GPU) 519 and/or a floating-point coprocessor for mathematical computations. System 500 may also include a system memory 502, which may be in the form of random-access memory (RAM), read-only memory (ROM), or both.

A number of controllers and peripheral devices may also be provided, as shown in FIG. 5. An input controller 503 represents an interface to various input device(s) 504, such as a keyboard, mouse, touchscreen, and/or stylus. The computing system 500 may also include a storage controller 507 for interfacing with one or more storage devices 508 each of which includes a storage medium such as magnetic tape or disk, or an optical medium that might be used to record programs of instructions for operating systems, utilities, and applications, which may include embodiments of programs that implement various aspects of the present disclosure.

Storage device(s) 508 may also be used to store processed data or data to be processed in accordance with the disclosure. The system 500 may also include a display controller 509 for providing an interface to a display device 511, which may be a cathode ray tube (CRT), a thin film transistor (TFT) display, organic light-emitting diode, electroluminescent panel, plasma panel, or other type of display. The computing system 500 may also include one or more peripheral controllers or interfaces 505 for one or more peripherals 506. Examples of peripherals may include one or more printers, scanners, input devices, output devices, sensors, and the like. A communications controller 514 may interface with one or more communication devices 515, which enables the system 500 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 516, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Figure 6:
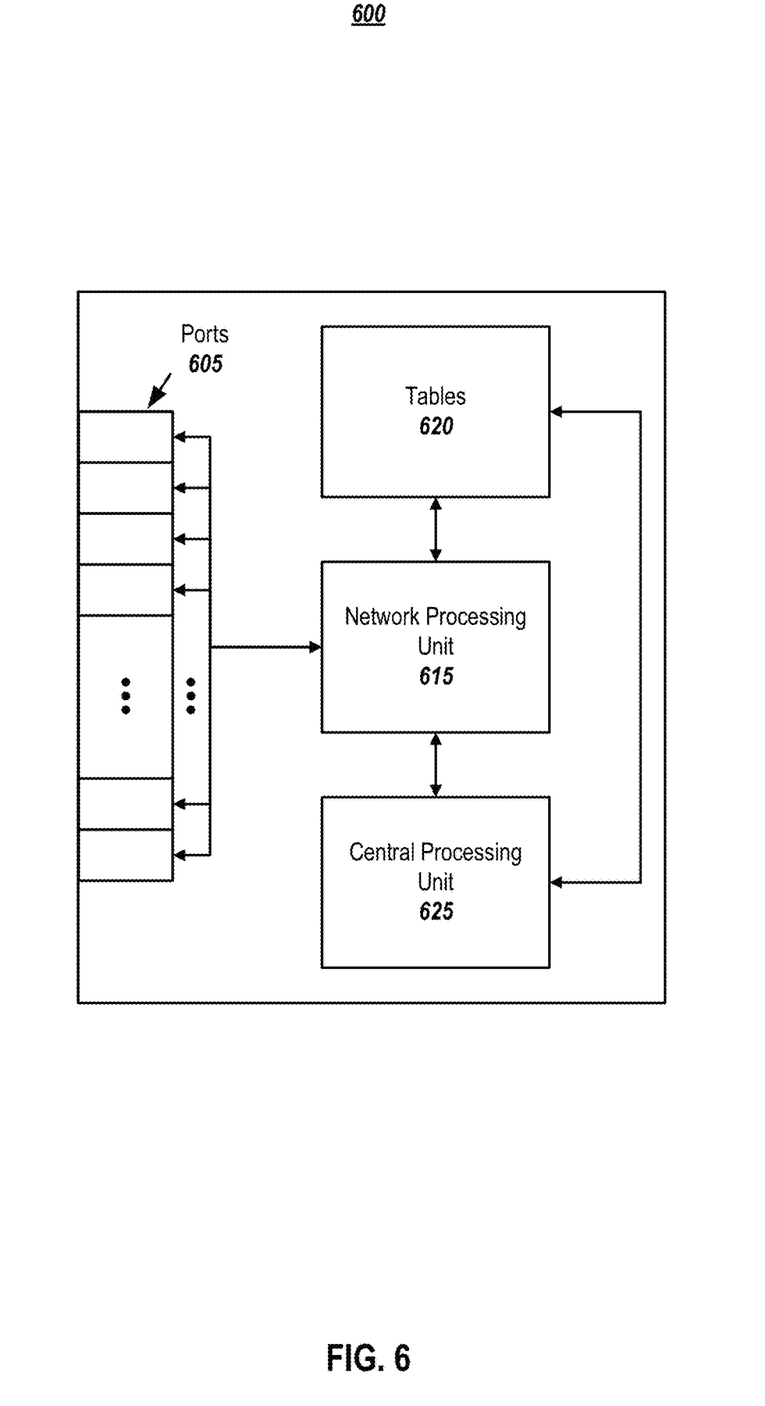
FIG. 6 depicts an alternative block diagram of an information handling system, according to embodiments of the present disclosure.

FIG. 6 depicts an alternative block diagram of an information handling system, according to embodiments of the present disclosure. It will be understood that the functionalities shown for system 600 may operate to support various embodiments of the present disclosure—although it shall be understood that such system may be differently configured and include different components (including fewer or more components).

The information handling system 600 may include a plurality of I/O ports 605, a network processing unit (NPU) 615, one or more tables 620, and a central processing unit (CPU) 625. The system includes a power supply (not shown) and may also include other components, which are not shown for sake of simplicity.

In one or more embodiments, the I/O ports 605 may be connected via one or more cables to one or more other network devices or clients. The network processing unit 615 may use information included in the network data received at the node 600, as well as information stored in the tables 620, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into sub-modules or combined.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for controlling broadcast, unknown- unicast, and multicast (BUM) traffic, the method comprising:

at a VTEP associated with a first Ethernet segment, obtaining network information regarding a set of virtual extensible local area network (VxLAN) tunnel endpoints (VTEPs), the set of VTEPs being associated with a second Ethernet segment; and using the network information by the VTEP associated with the first Ethernet segment and the at least some VTEPs among the set of VTEPs associated with the second Ethernet segment to determine a designated forwarder.

2. The computer-implemented method according to claim 1, further comprising sending BUM traffic that ingresses on the VTEP only to the designated forwarder.

3. The computer-implemented method according to claim 1, wherein obtaining the network information comprises obtaining an Ethernet segment identifier (ESID) that is derived from Type-4 route information.

4. The computer-implemented method according to claim 1, wherein determining the designated forwarder comprises determining a network identifier that is associated with an ESID, the ESID being associated with both the VTEP and the set of VTEPs.

5. The computer-implemented method according to claim 4, wherein the network identifier comprises a VLAN-ID.

6. The computer-implemented method according to claim 5, wherein the VLAN-ID is derived from a configuration information on the VTEP.

7. The computer-implemented method according to claim 5, further comprising using the VLAN-ID to generate a flood list, the flood list comprising a VTEP from the set of VTEPs that has been elected as the designated forwarder.

8. The computer-implemented method according to claim 1, wherein determining the designated forwarder comprises applying an election mechanism to the VTEP and to each VTEP in the set of VTEPs.

9. A non-transitory computer-readable medium or media comprising one or more sequences of instructions which, when executed by at least one processor, cause steps to be performed comprising:

obtaining from a VTEP, which is associated with a first Ethernet segment, network information regarding a set of virtual extensible local area network (VxLAN) tunnel endpoints (VTEPs), the set of VTEPs being associated with a second Ethernet segment; and using the network information by the VTEP associated with the first Ethernet segment and the at least some VTEPs among the set of VTEPs associated with the second Ethernet segment to determine a designated forwarder.

10. The non-transitory computer-readable medium or media of claim 9, further comprising the step of sending broadcast, unknown-unicast, and multicast traffic (BUM) traffic that ingresses on the VTEP to the designated forwarder.

11. The non-transitory computer-readable medium or media of claim 9, wherein obtaining the network information comprises obtaining an Ethernet segment identifier (ESID) that is derived from Type-4 route information.

12. The non-transitory computer-readable medium or media of claim 9, wherein determining the designated forwarder comprises determining a network identifier that is associated with an ESID, the ESID being associated with both the VTEP and the set of VTEPs.

13. The non-transitory computer-readable medium or media of claim 9, further comprising using a VLAN-ID to generate a flood list, the flood list comprising a VTEP from the set of VTEPs that has been elected as the designated forwarder.

14. The non-transitory computer-readable medium or media of claim 13, wherein the VLAN-ID is derived from a configuration information comprising an Ethernet virtual private network instance-route target.

15. An information handling system for controlling broadcast, unknown- unicast, and multicast (BUM) traffic, the information handling system comprising:

one or more processors; and a non-transitory computer-readable medium or media comprising one or more sets of instructions which, when executed by at least one of the one or more processors, causes steps to be performed comprising:

obtaining from a virtual extensible local area network (VxLAN) tunnel endpoint (VTEP), which is associated with a first Ethernet segment, network information regarding a set of VTEPs associated with a second Ethernet segment;

using the network information by the VTEP associated with the first Ethernet segment and the at least some VTEPs among the set of VTEPs associated with the second Ethernet segment to determine a designated forwarder;

receiving BUM traffic from a host;

sending the BUM traffic to the designated forwarder; and using a VLAN-ID to generate a flood list that comprises the designated forwarder.

16. The information handling system according to claim 15, wherein the network information comprises an Ethernet segment identifier (ESID).

17. The information handling system according to claim 16, wherein the ESID is derived from Type-4 route information.

18. The information handling system according to claim 15, wherein the steps further comprise determining a network identifier that is associated with an ESID, the ESID being associated with both the VTEP and the set of VTEPs.

19. The information handling system according to claim 15, wherein the VLAN-ID is derived from a configuration information that comprises an Ethernet virtual private network instance-route target.

20. The information handling system according to claim 15, wherein determining the designated forwarder comprises applying an election mechanism to the VTEP and to each VTEP in the set of VTEPs.

* * * * *